Sept. 26, 1944.   C. A. DE GIERS   2,358,910
INDICATING INSTRUMENT AND SCALE ADJUSTMENT THEREFOR
Filed June 12, 1942   3 Sheets-Sheet 1
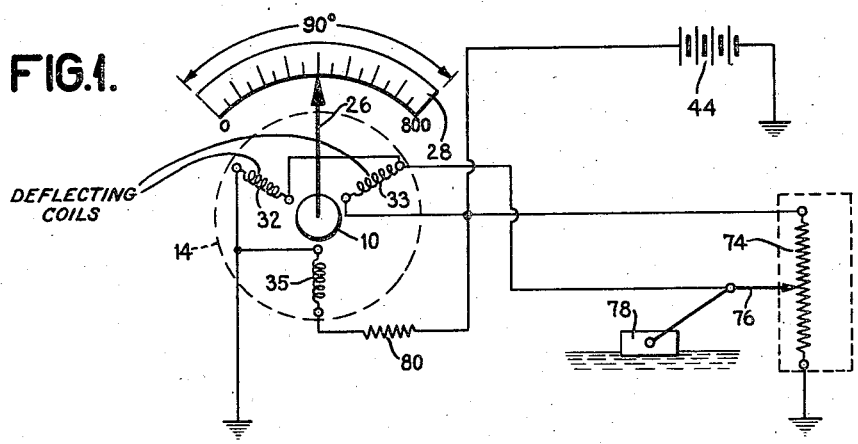
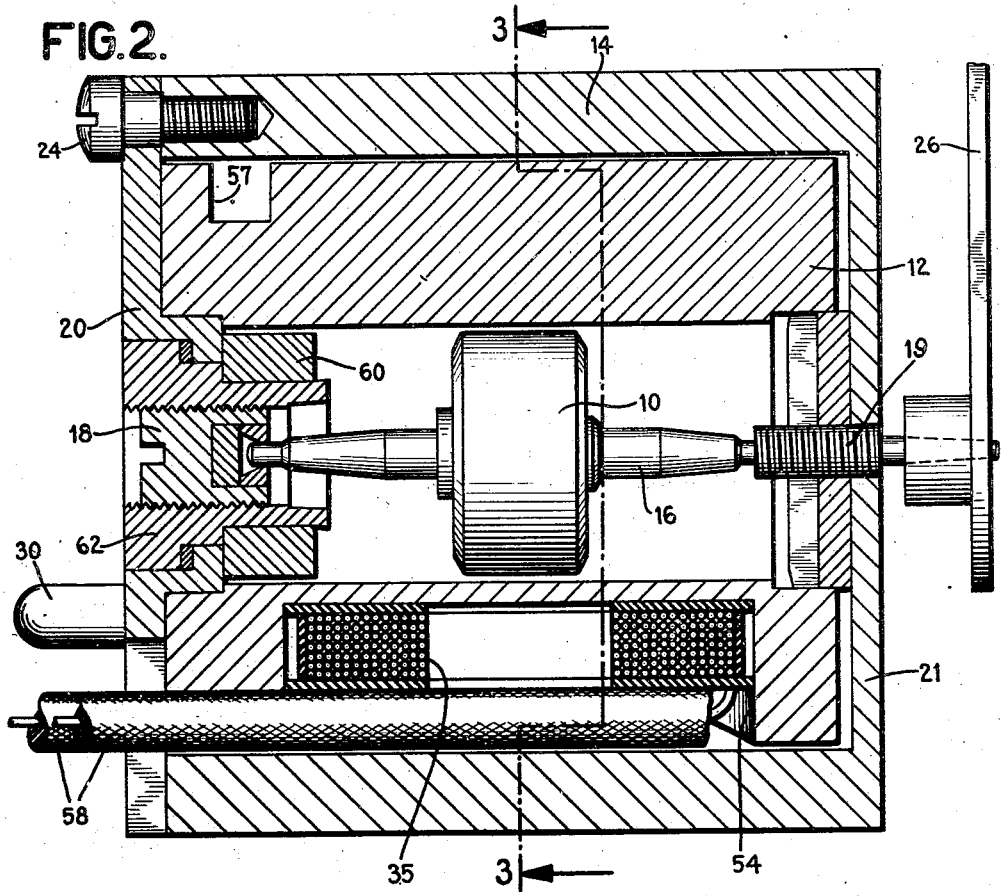
INVENTOR
Clarence A. de Giers
BY John C. Kerr
ATTORNEY Sept. 26, 1944. C. A. DE GIERS 2,358,910
INDICATING INSTRUMENT AND SCALE ADJUSTMENT THEREFOR
Filed June 12, 1942 3 Sheets-Sheet 2

INVENTOR
Clarence A. de Giers
BY John C. Kerr
ATTORNEY

Patented Sept. 26, 1944

2,358,910

UNITED STATES PATENT OFFICE 2,358,910

INDICATING INSTRUMENT AND SCALE
ADJUSTMENTS THEREFOR

Clarence A. de Giers, Forest Hills, N. Y., assignor
to The Liquidometer Corporation, Long Island
City, N. Y., a corporation of Delaware Application June 12, 1942, Serial No. 446,766

19 Claims. (Cl. 171—95)

This invention relates to electromagnetic translating devices. More specifically, it relates to indicating instruments. More particularly, it relates to ratio meters.

The invention has for some of its objects to effect improvements in the instrument disclosed in the copending United States application Serial No. 305,255, filed on November 20, 1939, by Frederick J. Lingel, for "Electrical translating instruments," among which improvements are the following: (1) to provide an improved coil mount and coil assembly; (2) to provide novel scale-adjusting means.

Other objects and advantages of my invention will appear to those skilled in the art upon reading the following description of the invention and of the manner and process of making, constructing, compounding, and using it, and I shall also explain herein what I now believe to be the principle thereof, and the best mode in which I have contemplated applying that principle.

Desiring to have it understood that my invention may be carried out by other means and with other apparatus, and that it may be used in other environments and for other purposes, I shall now proceed to describe what I now consider to be a preferred form of apparatus for practicing the invention.

Referring to he drawings:

Fig. 1 is a wiring diagram showing one of many forms of electrical connections that may be used with my invention.

Fig. 2 is a section taken on a plane through the axis of an instrument embodying my invention.

Figure 3:
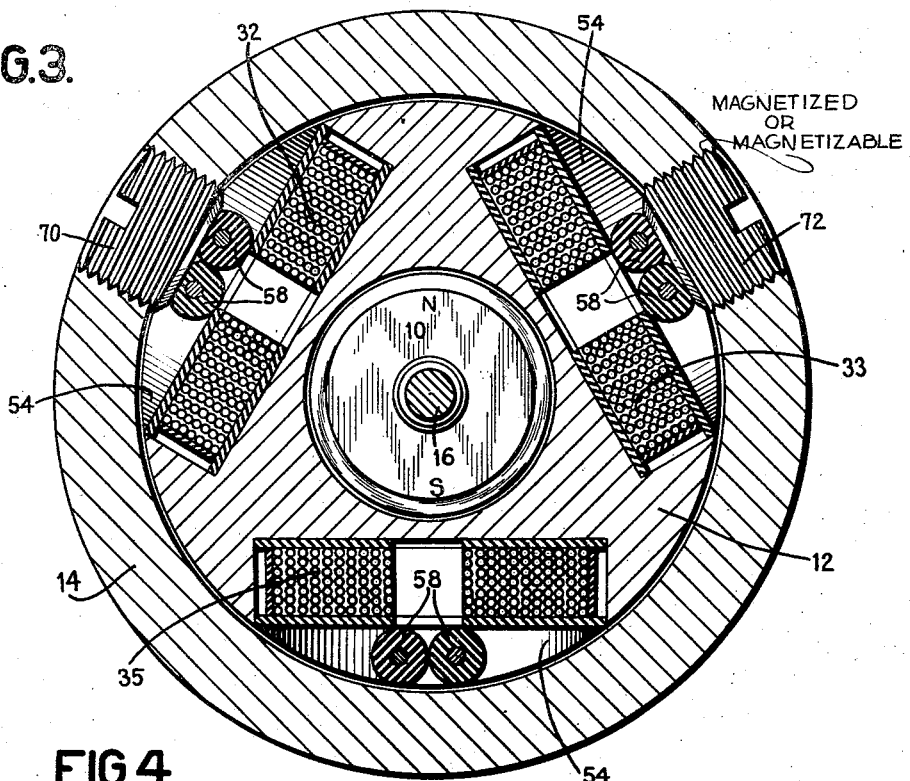
Fig. 3 is a section taken on the line 3—3 of Fig. 2.

The particular instrument shown is a ratio meter. It comprises a rotor or armature 10, which is permanently magnetized or poled transversely with respect to its axis of rotation or oscillation, a combined coil mount and damper 12, and a casing 14 which constitutes also a flux return path, magnetic shield, and bearing support.

The rotor 10 is preferably cylindrical and made of high coercive force material, such as Alnico, and is permanently magnetized so as to have a north pole on one side of the cylinder and a south pole on the other side, diametrically opposed to the north pole. The rotor 10 is secured to a shaft 16 coaxial with the rotor and rotatably mounted in bearings 18, 19, carried by the end plates 20, 21. Each of the bearings 18, 19 is longitudinally adjustable by virtue of the screw threads with which it is shown provided. Any rotation or oscillation of the rotor 10 produces corresponding movement of the shaft 16. The end plate 21 is integral with the casing 14, the latter being cup-shaped, and the end plate 20 is detachably secured to the other end of the casing 14 by means of screws 24.

While other forms of indicating means, such as a recording couple, may be utilized, I have shown an indicating couple comprising a pointer 26 secured to the prolongation of the shaft 16 and a suitably calibrated stationary scale 28.

Figure 4:
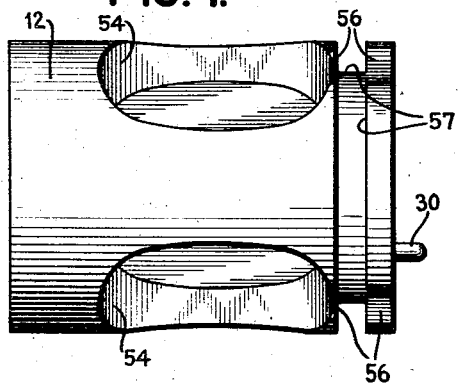
Fig. 4 is a detail view of a part of the instrument shown in Figs. 2 and 3.
Figure 5:
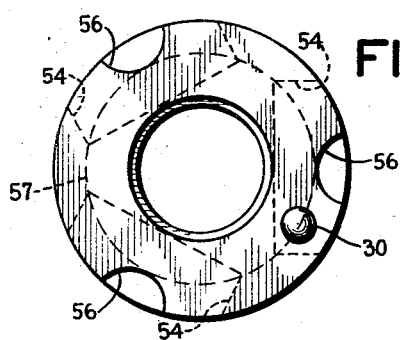
Fig. 5 is an end view of the coil mount shown in Fig. 4.
Figure 6:
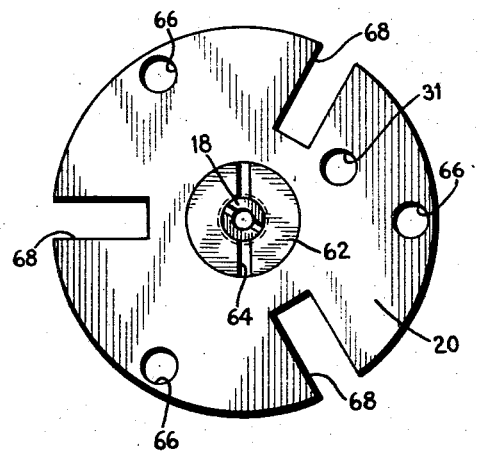
Fig. 6 is a detail view showing the detachable end plate seen in section in Fig. 2.

The coil mount 12 (Figs. 2 to 5) is constructed of a non-magnetic metal, such as copper, surrounds the rotor 10 and is surrounded by the casing 14 to which it is detachably secured as by a pin 30 (Figs. 4 to 6) extending from one end of the coil mount and through a hole 31 provided in the end plate 20. The particular instrument herein disclosed comprises three coils 32, 33 and 35, of which the coils 32, 33 are used as deflecting coils and the coil 35 as scale-adjusting coil; all as will more fully hereinafter appear. Each of these three coils is so mounted that its flux axis intersects and is at a right angle to the axis of rotation of the rotor 10 and so that the flux axis of each coil intersects those of the other two coils at angles of 120°. The coil mount 12 is substantially in the shape of a hollow cylinder (Figs. 2 to 5) and is provided with three peripheral coil-receiving wells 54; one for each of the coils 32, 33, 35. While these wells may in some cases each extend as peripheral slots from one end of the coil mount to the other, in order to facilitate manufacture, I have shown them as substantially oval to conform to the shape of the coils. The coil mount 12 is provided with three longitudially extending peripheral slots 56, each leading to a corresponding well; there being one for each pair of leads 58 of each coil. The coil mount 12 is provided also with a peripheral groove 57 adapted to receive a winding or wrapping of fine thread so as to hold the coils and coil leads in place on the coil mount during assembly.

The coil mount may readily be made of copper rod stock, bored, and machined to the shape shown. The construction, among other advantages, reduces winding time and greatly facilitates replacement of coils. The coils are separately wound and then inserted into the coil-receiving wells.

The cup-shaped casing 14 is made of magnetizable material, such as S. A. E. 1020, X1112, or B1113, steel, and copper plated.

The end plate 20 (Figs. 2 and 3) is constructed of non-magnetizable metal, and likewise all of the parts carried by it at its central portion with the exception of the annulus or sleeve 60 which is made of cold rolled steel and is permanently magnetized so as to have a north pole on one side of the cylindrical sleeve and a south pole on the other side diametrically opposed to the north pole. The permanently poled sleeve 60 is fixed to the bushing 62, as by means of upsetting or the like, so as to be rotatably adjustable therewith in the end plate 20. A screw-driver slot 64 is provided across the outer end of the bushing 62 to facilitate angular adjustment of the permanent magnet 60. The purpose of this magnet 60 will appear hereinafter. Besides the pin-receiving hole 31, the end plate 20 is provided with holes 66 for receiving the screws 24 that secure the end plate 20 to the casing 14. The end plate 20 is provided also with radially extending slots 68 through which the leads 58 of the coils 32, 33, 35 pass when the instrument is assembled.

Also, for a purpose hereinafter appearing, the casing 14 is provided with a plurality of tapped radial holes, one for each deflecting coil, for receiving the screws 70, 72 of magnetizable metal. These screws 70, 72 are coaxial with the flux axes of the coils 32, 33, respectively, and constitute radially adjustable iron cores for the essentially air-core deflecting coils. These screws 70, 72 may or may not be permanently magnetized and, if permanently magnetized, the north pole may be at either end of the screw with the south pole at the opposite end, all depending upon the kind of adjustment desired.

While the invention may be applied to other uses and in other ways, let it be assumed that it is desired to indicate the level of liquid in a tank, by a pointer 26 with a 90° scale. One form of electrical connection is shown in Fig. 1 in which the transmitting instrument, which may be quite remote from the indicating instrument, comprises a potentiometer 74 whose movable contact 76 is automatically operated by the float 78. The potentiometer is electrically connected across a suitable source of E. M. F. 44 and also across the deflecting coils 32, 33; the other ends of the latter being electrically connected to each other and to the sliding contact 76 of the potentiometer. The scale control coil 35 in series with a scale control resistance 80 is also electrically connected across the potentiometer.

The desiderative, in many cases in practice, is that when the transmitting element 76 moves from one of its extremes of travel to the other, as from empty to full position, or vice versa, the pointer 26 will move through 90°, and that the pointer will indicate accurately throughout that range; notwithstanding deviations of one sort or another that are unwanted but nevertheless occur between stock instruments which are supposed to be identical in construction.

The 90° full scale deflection may be attained by providing a variable resistance at 80 and suitably adjusting it for each particular instrument and then either leaving it at that adjustment or substituting a fixed resistance whose proper value had thus been empirically obtained. However, it is preferable in practice that a fixed resistance 80 be employed for a line of stock instruments. I therefore employ a fixed resistance 80 which will provide, in effect, a rough control or adjustment to attain approximately 90° full scale deflection, and I provide in addition a fine adjustment to attain the exact 90° full scale deflection. This may be more readily understood by reference to the vector diagrams, Figs. 7, 8 and 9.

Figure 7:
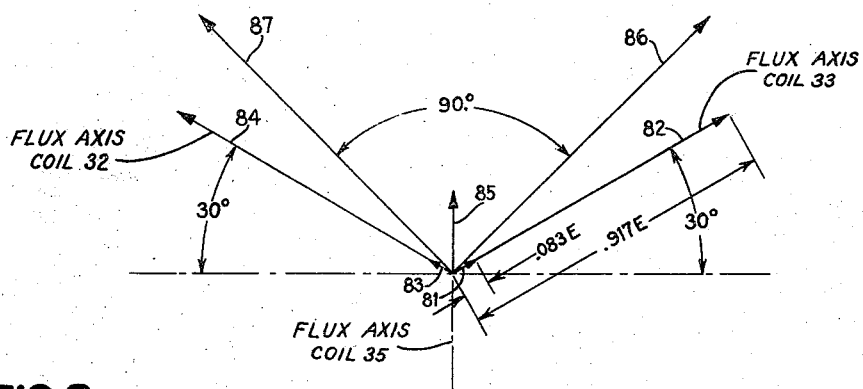
Figs. 7, 8 and 9 are vector diagrams to explain some of the features of the invention.

Referring first to Fig. 7, consider first the operation as though the magnet 60 were not present. The flux axes of the coils 32, 33 and 35 are as indicated, i. e. 120° apart. The vector 81 represents the flux due to the coil 33 at "empty" position; the vector 82 represents the flux due to the coil 33 at "full" position; the vector 83 represents the flux due to the coil 32 at "full" position; the vector 84 represents the flux due to the coil 32 at "empty" portion; and the vector 85 represents the flux due to the coil 35. Since the voltage across the coil 35 is independent of the float position, the vector 85 is constant. In the particular case illustrated, when the transmitter is at "empty," 8.3% of the applied voltage is across the coil 33 and 91.7% across the coil 32. At "empty" position, the resultant of the vectors 81, 84 and 85 is the vector 87 which represents the rotor (pointer) position when the tank is empty. At "full" position, the vectors 82, 83 and 85 combine to give the resultant vector 86 which represents the rotor (pointer) position when the tank is full. If the length of the constant vector 85 is correct for the particular indicating instrument, the angle between the vector 87 and 86 will be 90° as shown. However, due to manufacturing discrepancies, such as variations of the coils, coil mounts, or the charge of the particular rotor, the angle between the "empty" and "full" resultant vectors 87 and 86 may be less or greater than 90. This may be corrected by adjusting the angular position of the magnet 60 about the rotor axis. This will be explained as though it were desired to decrease the 90° angle of Fig. 7, or to increase that angle. Actually the procedure will be reversed, i. e. to cause the angle to be increased or decreased to become 90°, but the actual procedure will be understood without explanation in addition to what follows.

Figure 8:
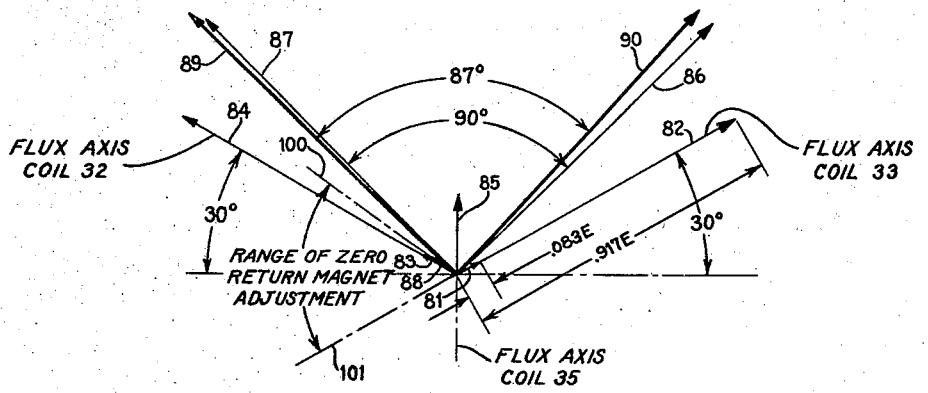

Turn now to Fig. 8, which is the same as Fig. 7 except that it includes an effect of the magnetic field set up by the permanent magnet 60. The range of angular adjustment of the magnet 60 is such that the vector representing the flux due to that magnet may lie on or anywhere between the radii 100 and 101 so far as biasing the pointer 26 to "off-scale" position (no current through any coil) is concerned. In other words, if the vector of the magnet 60 lies either on or anywhere between the radii 100, 101, the pointer will be off-scale so as to reveal that the system is not operating. Therefore, the particular angular adjustment of the magnet 60 is solely for the purpose of scale adjustment. Still referring to Fig. 8, suppose that the magnet 60 is such that its vector is at 88. As above explained, the resultant of the vectors 81, 84, 85, at "empty" position, is the vector 87. The resultant of the vectors 87 and 88 is the vector 89. Likewise, for the "full" position, the resultant of the vectors 86 and 88 is the vector 90. We now have an 87° scale instead of a 90° scale.

Figure 9:
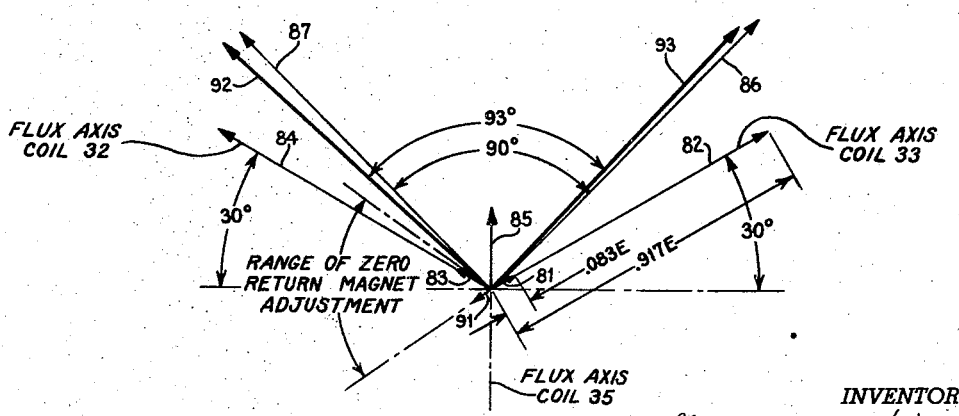

Suppose that the magnet 60 is now adjusted so that the vector representing the flux produced by it lies at 91, as in Fig. 9. The ultimate resultant of the vector 91 and the sub-resultant vector 87 will now be the vector 92, which is the "empty" position of the pointer 26. The ultimate resultant of the vector 91 and the sub-resultant vector 86 will now be the vector 93, which is the "full" position of the pointer 26. It will be seen that the angle between the "empty" and "full" positions of the pointer 26 is now 93°.

Since the range of adjustment by means of the magnet 60 is from 87° to 93°, it will be understood that if, without the magnet 60, the angle between the "empty" and "full" positions of the pointer 26 lies anywhere off 90° but between 87° and 93° then with any by the aid of the magnet 60, the said angle may be adjusted to become 90°.

After the limit of travel of the pointer 26 from "empty" to "full" has been adjusted to the desired 90°, the scale 28 may then be adjusted with respect to the casing 14 (and its enclosed parts) to cause the "empty" position of the pointer to coincide with the "empty" or zero graduation on the scale or dial 28. That having been done, the "full" postion of the pointer will, of course, coincide with the "full" or "800" calibration of the scale 28, since the "0" to "800" on the scale occupies an arc of 90°.

As above explained, the coil 35, resistance 80, and magnet 60, provide end scale control and adjustment. I shall now proceed to describe the operation of the screws 70, 72 in effecting center scale adjustment, proceeding on the assumption that the end scale adjustments have been effected.

Suppose that the pointer 26 reads low in its mid-position, i. e. that it is to the left of the middle when it should be in the middle. In this case, a brass screw is used at 70 (Fig. 3) and a steel screw 72 is inserted and adjusted toward the coil 33 until the pointer 26 coincides with center of the scale 28. The amount that this steel screw 72 is inserted determines the degree of the adjustment. The closer the steel screw 72 comes to the coil 33, the more the pointer will be moved toward the right. This steel screw 72 alters the linkages of the flux pattern, making the coil 33 relatively stronger; the screw is in effect to some extent iron core for the coil. It will be noted however, that the screw does not actually enter into the opening or air core of the coil due to its abutment against the leads 58 as the inward limiting position. Thus, the coil 33 is still primarily an air core coil and without the disadvantages incident to the use of such coils with an iron core extending through the coil opening. If the pointer 26 reads too high at its center position, a brass screw is used at 72 and a steel screw would be employed at 70 to cause the pointer to coincide with the central scale reading.

Each screw 70 or 72 used to effect the center scale adjustment may, as stated, be made of steel and either permanently magnetized or not. If permanently magnetized, the inner end may be either the north or the south pole. Whether the inner end is north or south merely affects the depth of adjustment required to bring about the desired result. Normally only one steel adjusting screw is used at a time, the other being replaced by a brass screw.

Features of my invention are applicable to instruments using scales other than 90°. For example, all three coils 32, 33 and 35 may constitute deflecting coils for providing a scale reading from 0° to 360°; it being understood, of course, that in such case a suitably different transmitting istrument would be employed. When all three coils are employed as deflecting coils, only one screw, for example the screw 70, may be employed for the scale adjustment in many cases. It will now be obvious to those skilled in the art that my invention may be employed with scales other than 90° or 360°.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted, without interfering with the more general results outlined, and the invention extends to such use within the scope of the appended claims.

What I claim is:

1. A ratio instrument comprising in combination, an indication-controlling rotor permanently magnetized across a diameter thereof, a substantially cylindrical non-magnetic metallic stationary coil mount having a bore in which said rotor is located, a plurality of angularly spaced coils each detachably mounted in said coil mount between said rotor-receiving bore and the periphery of said coil mount and each coil having a radially extending flux axis, some of said coils constituting deflecting coils and at least one of them constituting a scale-control coil, a shield of magnetizable metal surrounding said coil mount, a stationary cylindrical supplemental scale-controlling element permanently magnetized across a diameter and mounted for angular adjustment about its axis which is coaxial with said rotor whereby the maximum and minimum deflections of said rotor by said coils may be adjusted, and means for adjusting the reluctance of the flux path of each of said deflecting coils with respect to that of the other coils to adjust the rotor deflection at intermediate positions, said last mentioned means comprising permanently magnetized screws detachably and adjustably mounted in tapped radially extending holes in the periphery of said shield, each of said last mentioned holes being coaxial with the flux axis of a corresponding one of said deflecting coils.

2. A ratio instrument comprising in combination, an indication-controlling rotor permanently magnetized across a diameter thereof, a substantially cylindrical non-magnetic metallic stationary coil mount having a bore in which said rotor is located, a plurality of angularly spaced coils each detachably mounted in said coil mount between said rotor-receiving bore and the periphery of said coil mount and each coil having a radially extending flux axis, some of said coils constituting deflecting coils and at least one of them constituting a scale-control coil, a shield of magnetizable metal surrounding said coil mount, a stationary cylindrical scale-controlling element permanently magnetized across a diameter and mounted for angular adjustment about its axis which is coaxial with said rotor whereby the maximum and minimum deflections of said rotor by said coils may be adjusted, and means for adjusting the reluctance of the flux path of each of said deflecting coils with respect to that of the other coils to adjust the rotor deflection at intermediate positions, said last mentioned means comprising screws of magnetizable metal detachably and adjustably mounted in tapped radially extending holes in the periphery of said shield, each of said last mentioned holes being coaxial with the flux axis of a corresponding one of said deflecting coils.

3. A ratio instrument comprising in combination, an indication-controlling rotor permanently magnetized across a diameter thereof, a non-magnetic metallic stationary coil mount having a bore in which said rotor is located, a plurality of angularly spaced coils each detachably seated in an inward recess of said coil mount between said rotor-receiving bore and the periphery of said coil mount and each coil having a radially extending flux axis, some of said coils constituting deflecting coils and at least one of them constituting a scale-control coil, a shield of magnetizable metal surrounding said coil mount, and means for adjusting the reluctance of the flux path of each of said deflecting coils with respect to that of the other coils to adjust the rotor deflection at intermediate positions, said last mentioned means comprising screws of magnetizable metal detachably and adjustably mounted in tapped radially extending holes in the periphery of said shield, each of said last mentioned holes being coaxial with the flux axis of a corresponding one of said deflecting coils.

4. A ratio instrument comprising in combination, an indication-controlling rotor permanently magnetized across a diameter thereof, a substantially cylindrical non-magnetic metallic stationary coil mount having a bore in which said rotor is located, a plurality of angularly spaced coils each detachably mounted in said coil mount between said rotor receiving bore and the periphery of said coil mount and each coil having a radially extending flux axis, some of said coils constituting deflecting coils and at least one of them constituting a scale-control coil, a shield of magnetizable metal surrounding said coil mount, a stationary cylindrical scale-controlling element permanently magnetized across a diameter and mounted for angular adjustment about its axis which is coaxial with said rotor whereby the maximum and minimum deflections of said rotor by said coils may be adjusted, and means for adjusting the reluctance of the flux path of each of said deflecting coils with respect to that of the other coils to adjust the rotor deflection at intermediate positions.

5. A ratio instrument comprising in combination, an indication-controlling rotor permanently magnetized across a diameter thereof, a substantially cylindrical non-magnetic metallic stationary coil mount having a bore in which said rotor is located, a plurality of angularly spaced coils each detachably mounted in said coil mount between said rotor-receiving bore and the periphery of said coil mount and each coil having a radially extending flux axis, some of said coils constituting deflecting coils and at least one of them constituting a scale-control coil, a shield of magnetizable metal surrounding said coil mount, and means for adjusting the reluctance of the flux path of each of said deflecting coils with respect to that of the other coils to adjust the rotor deflection at intermediate positions.

6. A ratio instrument comprising in combination, an indication-controlling rotor permanently magnetized across a diameter thereof, a substantially cylindrical non-magnetic metallic stationary coil mount having a bore in which said rotor is located, a plurality of angularly spaced coils each detachably mounted in said coil mount between said rotor-receiving bore and the periphery of said coil mount and each coil having a radially extending flux axis, some of said coils constituting deflecting coils and at least one of them constituting a scale-control coil, a shield of magnetizable metal surrounding said coil mount, and means for adjusting the reluctance of the flux path of each of said deflecting coils with respect to that of the other coils to adjust the rotor deflection at intermediate positions, said last mentioned means comprising permanently magnetized screws detachably and adjustably mounted in tapped radially extending holes in the periphery of said shield, each of said last mentioned holes being coaxial with the flux axis of a corresponding one of said deflecting coils.

7. A ratio instrument comprising in combination, an indication-controlling rotor permanently magnetized across a diameter thereof, a substantially cylindrical non-magnetic stationary coil mount having a bore in which said rotor is located, a plurality of angularly spaced coils each detachably seated in an inward recess of said coil mount between said rotor-receiving bore and the periphery of said coil mount and each coil having a radially extending flux axis, two of said coils constituting deflecting coils and one of them constituting a scale-control coil, a shield of magnetizable metal surrounding and supporting said coil mount, a stationary cylindrical scale connecting permanent magnet mounted for angular adjustment about its axis which is coaxial with said rotor whereby the maximum and minimum deflections of said rotor by said coils may be adjusted, and means for adjusting the reluctance of the flux path of each of said deflecting coils with respect to that of the other coils to adjust the rotor deflection at intermediate positions, said last mentioned means comprising screws of magnetizable metal detachably and adjustably mounted in tapped radially extending holes in the periphery of said shield, each of said last mentioned holes being coaxial with the flux axis of a corresponding one of said deflecting coils.

8. A ratio instrument comprising in combination, an indication-controlling rotor permanently magnetized across a diameter thereof, a plurality of stationary coils positioned to produce fluxes across the rotor axis at an angle to each other, some of said coils constituting deflecting coils and at least one of them constituting a scale extent limiting coil, means for varying the current through one of said deflecting coils with respect to the current through another of said deflecting coils and for maintaining the current through said scale extent limiting coil substantially constant, permanently magnetized adjustable scale-control means for angularly shifting the resultant of the magnetic fields produced by said coils, and scale-control means for adjusting the reluctance of the flux path of each of said deflecting coils with respect to that of the other coils.

9. A ratio instrument comprising in combination, an indication-controlling rotor permanently magnetized across a diameter thereof, a plurality of stationary coils positioned to produce fluxes across the rotor axis at an angle to each other, some of said coils constituting deflecting coils and at least one of them constituting a scale extent limiting coil, means for varying the E. M. F. across one of said deflecting coils with respect to the E. M. F. across another of said deflecting coils and for maintaining the E. M. F. across said scale extent limiting coil substantially constant, permanently magnetized adjustable scale-control means for angularly shifting the resultant of the magnetic fields produced by said coils, and scale-control means for adjusting the reluctance of the flux path of each of said deflecting coils with respect to that of the other coils.

10. A ratio instrument comprising in combination, an indication-controlling rotor permanently magnetized across a diameter thereof, a plurality of stationary coils positioned to produce fluxes across the rotor axis at an angle to each other, some of said coils constituting deflecting coils and at least one of them constituting a scale extent limiting coil, means for varying the current through one of said deflecting coils with respect to the current through another of said deflecting coils and for maintaining the current through said scale extent limiting coil substantially constant, and permanently magnetized adjustable scale-control means for angularly shifting the resultant of the magnetic fields produced by said coils.

11. A ratio instrument comprising in combination, an indication controlling rotor permanently magnetized across a diameter thereof, a plurality of stationary coils positioned to produce fluxes across the rotor axis at an angle to each other, some of said coils constituting deflecting coils and at least one of them constituting a scale extent limiting coil, means for varying the E. M. F. across one of said deflecting coils with respect to the E. M. F. across another of said deflecting coils and for maintaining the E. M. F. across said scale extent limiting coil substantially constant, and permanently magnetized adjustable scale-control means for angularly shifting the resultant of the magnetic fields produced by said coils.

12. A ratio instrument comprising in combination, an indication-controlling rotor permanently magnetized across a diameter thereof, a plurality of stationary deflecting coils, a stationary scale extent limiting coil, said coils producing fluxes across the rotor axis at an angle to each other, remotely located means for varying the magneto-motive force of one of said deflecting coils with respect to that of another of said deflecting coils, manually adjustable permanently magnetized means for angularly shifting the resultant of the fluxes produced by said coils, and manually adjustable means for changing the reluctance of the flux path of any of said deflecting coils with respect to that of another deflecting coil.

13. A ratio instrument comprising in combination, an indication-controlling rotor permanently magnetized across a diameter thereof, a plurality of deflecting coils positioned to produce fluxes across the rotor axis at an angle to each other, automatic means for varying the relative magneto-motive forces of said deflecting coils, manually adjustable permanently magnetized means for angularly shifting the resultant of the fluxes produced by said coils, and manually adjustable means for selectively adjusting the reluctance of the flux path of at least one of said coils.

14. A current-responsive instrument comprising, in combination, a permanent magnet of relatively high coercive force material substantially symmetrical about an axis and magnetized transversely thereto, a current conducting coil, said magnet and said coil being mounted to permit relative motion between said coil and said magnet about said axis, a magnetic shield spaced from and surrounding said permanent magnet, said coil lying wholly outside the periphery of said magnet and occupying a portion of the space between said shield and magnet, and a hollow metallic substantially cylindrical eddy current damper and coil mount substantially coaxial with said permanent magnet and occupying a greater portion of the space between said shield and said magnet, said coil being as a unit removably mounted in a well recess extending inwardly radially from the outer periphery of said coil mount and being mounted substantially entirely within the periphery of said coil mount and wholly to one side of said permanent magnet.

15. A ratio instrument comprising, in combination, an armature consisting of a cylinder of relatively high coercive force material polarized across a diameter thereof and pivoted for rotation on its cylindrical axis, a stationary cylinder of non-magnetic conducting material surrounding said armature for damping said armature and serving as a coil mount, a pair of stationary coils positioned to produce fluxes across the axis of said armature at an angle to each other such that the armature is positioned by the resultant flux of said coils, said coils each being as a unit removably mounted in a corresponding well recess extending inwardly radially from the outer periphery of said coil mount and each coil lying wholly outside the periphery of said armature and to one side of said armature, and a cylindrical magnetic shield surrounding said instrument, said coils being mounted in and carried by said coil mount and being mounted substantially entirely within the periphery of said cylinder of non-magnetic conducting material.

16. A current-responsive instrument comprising, in combination, a permanent magnet of relatively high coercive material mounted for rotation about an axis and magnetized transversely thereto, a substantially cylindrical metallic damping member substantially co-axial with said magnet and having a bore in which said magnet is located, a stationary deflecting coil as a unit removably mounted in a well recess extending inward radially from the outer periphery of said damping member wholly outside the periphery of the bore of said damping member and to one side of said permanent magnet and having its flux axis substantially at right angles to the axis of rotation of said permanent magnet, a magnetic shield surrounding said first mentioned magnet, said damping member, and said coil; and means for biasing said first mentioned magnet to a predetermined position.

17. In an instrument of the class described, in combination, a substantially cylindrical metallic non-magnetizable coil mount having a substantially cylindrical bore adapted to receive a substantially cylindrical rotor, said coil mount having coil-receiving recesses in the periphery thereof, and a plurality of air-core coils each as a unit removably mounted in a well recess extending inwardly radially from the outer periphery of said coil mount and wholly to one side of the periphery of the bore of said coil mount whereby a rotor may be inserted into and withdrawn from the bore of said coil mount without disturbing said coils.

18. A current-responsive instrument comprising, in combination, a permanent magnet of relatively high coercive force material substantially symmetrical about an axis and magnetized transversely thereto, a current conducting coil, said magnet and said coil being mounted to permit relative motion between said coil and said magnet about said axis, the flux axis of said coil being perpendicular to the first mentioned axis, a magnetic shield spaced from and surrounding said permanent magnet, said coil lying wholly outside the periphery of said magnet and occupying a portion of the space between said shield and magnet, and a hollow metallic substantially cylindrical coil mount occupying a greater portion of the space between said shield and said magnet, said coil being as a unit removably mounted in a well recess extending inwardly radially from the outer periphery of said coil mount and being mounted substantially entirely within the periphery of said coil mount and wholly to one side of said permanent magnet.

19. A ratio instrument comprising in combination, an indication-controlling rotor permanently magnetized across a diameter thereof, a plurality of deflecting coils positioned to produce fluxes across the rotor axis at an angle to each other, automatic means for varying the relative magneto-motive forces of said deflecting coils, manually adjustable permanently magnetized means for angularly shifting the resultant of the fluxes produced by said coils, and manually adjustable means for adjusting the reluctance of the flux path of one of said coils with respect to another of said coils, said last mentioned means comprising a screw of magnetizable metal adjustably mounted in the flux path of one of said coils.

CLARENCE A. DE GIERS.